(12) United States Patent
Ambartsoumian

(10) Patent No.: US 12,258,501 B2
(45) Date of Patent: Mar. 25, 2025

(54) LABEL WITH EMBOSSED RELEASE LINER

(71) Applicant: Gourgen Ambartsoumian, Laval (CA)

(72) Inventor: Gourgen Ambartsoumian, Laval (CA)

( * ) Notice: Subject to any disclaimer, the term of this patent is extended or adjusted under 35 U.S.C. 154(b) by 148 days.

(21) Appl. No.: 17/800,074

(22) PCT Filed: Feb. 17, 2021

(86) PCT No.: PCT/CA2021/050168
§ 371 (c)(1),
(2) Date: Aug. 16, 2022

(87) PCT Pub. No.: WO2021/163790
PCT Pub. Date: Aug. 26, 2021

(65) Prior Publication Data
US 2023/0086349 A1    Mar. 23, 2023

Related U.S. Application Data

(60) Provisional application No. 62/992,254, filed on Mar. 20, 2020, provisional application No. 62/977,587, filed on Feb. 17, 2020.

(51) Int. Cl.
*C09J 7/20* (2018.01)
*C09J 7/40* (2018.01)
*G09F 3/02* (2006.01)
*G09F 3/10* (2006.01)

(52) U.S. Cl.
CPC ............. *C09J 7/203* (2018.01); *C09J 7/403* (2018.01); *G09F 3/10* (2013.01); *C09J 2203/334* (2013.01); *C09J 2301/204* (2020.08); *G09F 2003/0222* (2013.01)

(58) Field of Classification Search
CPC ...... C09J 7/203; C09J 7/403; C09J 2203/334; C09J 2301/204; C09J 2400/226; G09F 3/10; G09F 2003/0222
See application file for complete search history.

(56) References Cited

U.S. PATENT DOCUMENTS

| 5,344,681 A * | 9/1994 | Calhoun | C09J 7/20 |
| | | | 428/354 |
| 6,238,762 B1 * | 5/2001 | Friedland | C09J 7/20 |
| | | | 428/167 |
| 9,993,988 B2 * | 6/2018 | Patel | B32B 33/00 |
| 2003/0017291 A1 | 1/2003 | Fleming et al. | |
| 2003/0129343 A1 * | 7/2003 | Galkiewicz | C09J 7/38 |
| | | | 428/40.1 |

(Continued)

FOREIGN PATENT DOCUMENTS

| JP | S47037857 | 12/1972 |
| JP | S54084356 | 6/1979 |

(Continued)

*Primary Examiner* — Patricia L. Nordmeyer
(74) *Attorney, Agent, or Firm* — NORTON ROSE FULBRIGHT CANADA LLP

(57) ABSTRACT

A label and liner assembly comprises one or more labels, the label(s) including a facestock and an adhesive layer on a surface of the facestock. A support liner is releasably adhered to the adhesive layer, the support liner defining a plurality of embossings projecting from a surface of the support liner toward or away from the label. A transfer tape and a method for assembling label material are also provided.

20 Claims, 4 Drawing Sheets

(56) References Cited

U.S. PATENT DOCUMENTS

| | | | |
|---|---|---|---|
| 2008/0299346 A1 | 12/2008 | Onderisin et al. | |
| 2016/0174643 A1 | 6/2016 | Miller et al. | |
| 2020/0255697 A1* | 8/2020 | McKillip | C09J 7/403 |
| 2022/0177745 A1* | 6/2022 | Hardy | C09J 7/385 |

FOREIGN PATENT DOCUMENTS

| | | | |
|---|---|---|---|
| JP | H04018638 | 2/1992 | |
| JP | H06073140 U | 10/1994 | |
| JP | H71053 U | 1/1995 | |
| JP | H08283676 | 10/1996 | |
| JP | 3042997 | 11/1997 | |
| JP | 3043161 | 11/1997 | |
| JP | H10219205 | 8/1998 | |
| JP | 2013031524 | 2/2013 | |
| JP | 2018053022 | 4/2018 | |
| KR | 100795949 | 1/2008 | |
| WO | WO-9725268 A2 * | 7/1997 | B05D 1/28 |
| WO | 2011100181 | 8/2011 | |
| WO | 2014/179660 A1 | 11/2014 | |
| WO | 2019217179 | 11/2019 | |

* cited by examiner

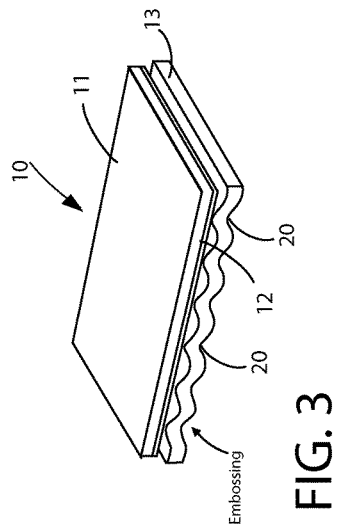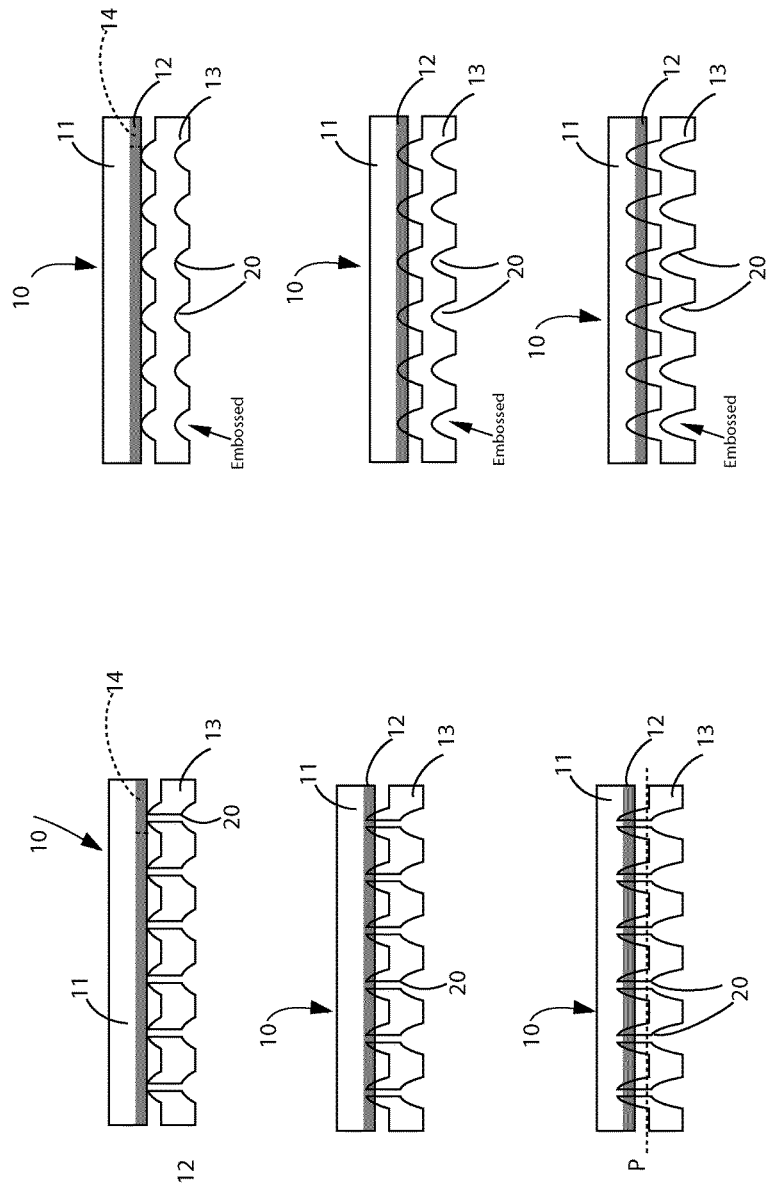

LABEL WITH EMBOSSED RELEASE LINER

CROSS-REFERENCE TO RELATED APPLICATIONS

The present application claims the priority of U.S. Patent Application No. 62/977,587, filed on Feb. 17, 2020, and of U.S. Patent Application No. 62/992,254, filed on Mar. 20, 2020, the contents of which are incorporated herein by reference.

TECHNICAL FIELD

The present application relates to labels of the type commonly found in rolls or sheets, as supported by a release liner (a.k.a., support liner).

BACKGROUND OF THE INVENTION

Labels are used in numerous applications. Labels may come in a variety of configurations, many of which include a facestock of the label being releasably adhered to a release liner by an adhesive. Such labels may be available in rolls, sheets, etc. In some instances, due to the relatively small size of the labels and/or the quality of the adhesives and/or the flexibility and material type of the facestock, or a combination of factors, it may be difficult to peel off a label from a release liner.

SUMMARY OF THE INVENTION

According to a first aspect of present disclosure, there is provided a label and liner assembly comprising at least one label including a facestock and an adhesive layer on a surface of the facestock; and a support liner releasably adhered to the adhesive layer, the support liner defining a plurality of embossings projecting from a surface of the support liner toward or away from the label.

Further in accordance with the first aspect, for example, there are a plurality of the at least one label for the support liner.

Still further in accordance with the first aspect, for example, the liner is wound into a roll.

Still further in accordance with the first aspect, for example, the liner is in a sheet.

Still further in accordance with the first aspect, for example, at least some of the embossings perforate through the support liner.

Still further in accordance with the first aspect, for example, at least some of the embossings do not perforate through the support liner.

Still further in accordance with the first aspect, for example, the adhesive layer has a neutralized zone.

Still further in accordance with the first aspect, for example, at least some of the embossings extend into an undersurface of the facestock.

Still further in accordance with the first aspect, for example, at least some of the embossings extend into the adhesive layer with embossing an undersurface of the facestock.

Still further in accordance with the first aspect, for example, the embossings have an elongated shape.

Still further in accordance with the first aspect, for example, the embossings are circular or oval.

Still further in accordance with the first aspect, for example, a number of embossings per square centimeter is between 4 and 20 inclusively.

Still further in accordance with the first aspect, for example, a number of embossings per square centimeter is between 18 and 60 inclusively.

Still further in accordance with the first aspect, for example, a number of embossings per square centimeter is between 49 and 170 inclusively.

Still further in accordance with the first aspect, for example, a distance between an end of one of the embossings and a start of an adjacent one of the embossings is between 0.01 mm and 3.5 mm, inclusively.

Still further in accordance with the first aspect, for example, a distance between an end of one of the embossings and a start of an adjacent one of the embossings is between 1.5 mm and 7.0 mm, inclusively.

Still further in accordance with the first aspect, for example, a distance between an end of one of the embossings and a start of an adjacent one of the embossings is between 3.0 mm and 13.0 mm, inclusively.

Still further in accordance with the first aspect, for example, a thickness of the facestock is between 0.3 mil and 40 mil, inclusively.

Still further in accordance with the first aspect, for example, a thickness of the facestock is between 0.4 mil and 2.6 mil, inclusively.

Still further in accordance with the first aspect, for example, a thickness of the facestock is between 1.0 mil and 4.6 mil, inclusively.

Still further in accordance with the first aspect, for example, a thickness of the facestock is between 0.8 mil and 8.0 mil, inclusively.

Still further in accordance with the first aspect, for example, a thickness of the support liner is between 0.4 mil and 20 mil, inclusively.

Still further in accordance with the first aspect, for example, a thickness of the support liner is between 0.9 mil and 4.0 mil, inclusively.

Still further in accordance with the first aspect, for example, a thickness of the support liner is between 0.8 mil and 6.0 mil, inclusively.

Still further in accordance with the first aspect, for example, a facestock is blank.

Still further in accordance with the first aspect, for example, further including data printed on the facestock.

Still further in accordance with the first aspect, for example, the sheet has a letter format or an A4 format.

In accordance with a second aspect of the present disclosure, there is provided a transfer tape comprising an adhesive layer; a waste liner releasably adhered to a first surface of the adhesive layer; a support liner releasably adhered to a second surface of the adhesive layer, the support liner defining a plurality of embossings projecting from a surface of the support liner toward or away from the waste liner.

In accordance with a third aspect of the present disclosure, there is provided method for assembling a label material comprising: embossing a support liner, applying an adhesive layer to the support liner, and applying a facestock to the adhesive layer, wherein the embossing and applying the adhesive layer are in any order.

Further in accordance with the third aspect, for example, including applying a waste liner to the adhesive layer on an opposite side from the support liner, and removing the waster liner prior to applying a facestock to the adhesive layer.

Still further in accordance with the third aspect, for example, a label from the label material is die-cut, the label including the facestock and the adhesive, the label being supported by the support liner.

Still further in accordance with the third aspect, for example, the label is detached from the support liner.

Still further in accordance with the third aspect, for example, the detaching is done manually.

Still further in accordance with the third aspect, for example, the detaching is done automatically.

BRIEF DESCRIPTION OF THE FIGURES

FIG. 3 is a perspective view of an assembly of label and support liner with micro-embossings in accordance with the present disclosure;

FIG. 4 are schematic sectional views of the assembly of label and support liner with micro-embossings in accordance with the present disclosure;

FIG. 5 are schematic sectional views of the assembly of label and support liner with micro-embossings in accordance with the present disclosure;

BRIEF DESCRIPTION OF THE EMBODIMENTS

Figure 2:
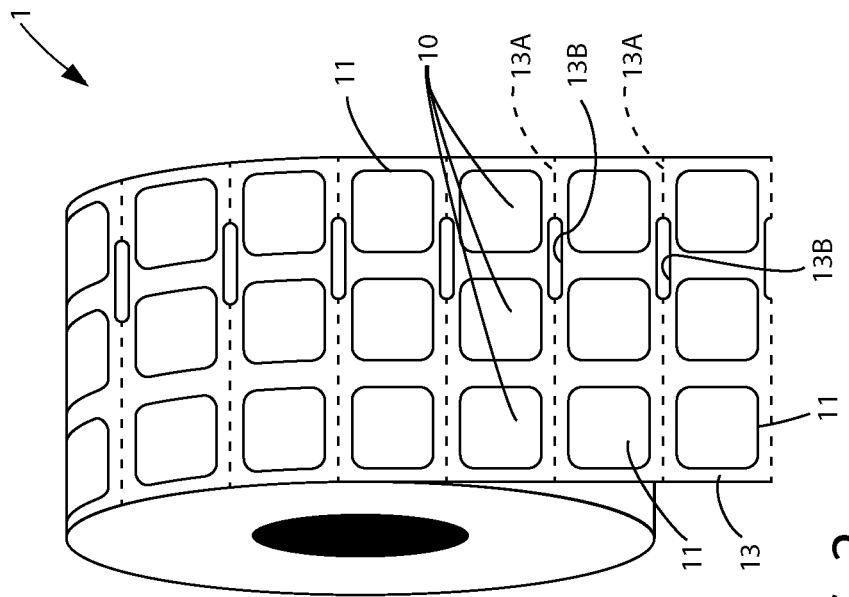
FIG. 2 is a perspective view of a roll of labels in accordance with another embodiment of the present disclosure.
Figure 1:
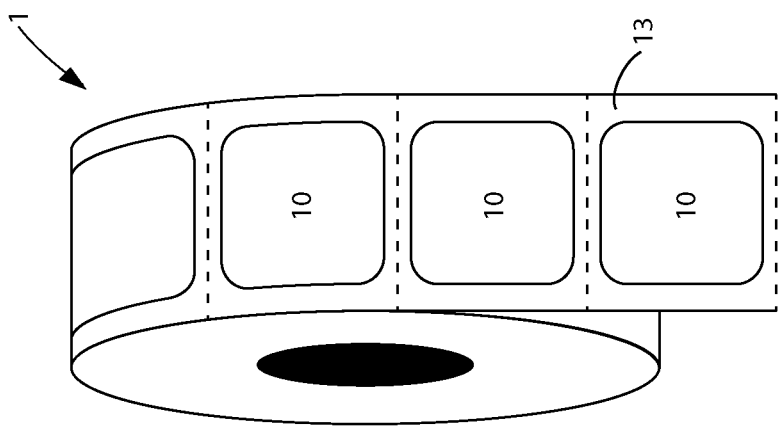
FIG. 1 is a perspective view of a roll of labels in accordance with an embodiment of the present disclosure.

Referring to the drawings and more particularly to FIGS. 1 and 2, a roll of labels in accordance with the present disclosure is generally shown at 1, and supports a plurality of labels 10. The labels 10 are shown as being part of the roll 1, but other configurations are contemplated, such as multiple labels 10 for a single sheet such as letter size sheet (8.5"×11"), A4 size sheet (8.25"×11.75"), or a single label 10 per support liner strip, among other possibilities.

Referring to FIGS. 1 to 3, the labels 10 may have various layers. The labels 10 may be of the type that may be used to manually inscribe information thereon. The labels 10 may also be of the type used by a printer. Facestock 11 is the surface that can accept ink or printing, although the capability of accepting ink is not a requirement. This may include printing using a thermal printer, a thermal-transfer printer, a direct-thermal printer, a laser printer, an inkjet printer, impact printer, dot-matrix printer, laser-etching printer, flexographic printer or a printing press or any other type of printer or a device capable of applying ink to a surface. The facestock 11 may be a custom facestock when the labels 10 are used in the context of a transfer tape, as described below. The facestock 11 itself may include one or more layers, including transparent and opaque layers, shielding layer(s), top coatings, inks, varnishes, laminations, nano-coatings, nano-materials, wireless communication capabilities such as RFID (Radio Frequency Identification), NFC (Near Field Communication), Bluetooth® and other types of wireless communication tags or chips, sensor, etc. The labels 10 can be provided blank or printed with any background color or color indicator such as thermochromic ink, and/or image, and/or information and/or barcode and/or alphanumeric markings, and/or indicia etc. The facestock materials may include but are not limited to polymers such as polypropylene, biaxially oriented polypropylene, polyester, polystyrene, vinyl or polyvinyl including polyvinyl chloride and polyvinyl fluoride, acrylate, nylon, satin, polyolefin, polyethylene, polyimide, tyvek, composite materials, thermoplastic films, cloth, tissues, rubber including silicone rubber, foam, Velcro, degradable and soluble materials such as water-soluble materials, including biodegradable materials. The facestock materials include fibers, cellulose fibers, plant fibers, paper, impregnated paper such as latex impregnated or paper impregnated with any substance, paper and polymer composites or combinations, cloth and polymer composites or combinations, including layers of polymer and paper and/or cloth, such that the paper or cloth is for example laminated with plastic, composite materials resulting from an extrusion process. Embossed, stamped foil, clear, opaque, transparent, translucent and/or reflective materials may also be used for the facestock 11. The polymers may be thermoplastics or thermosoftening plastics, i.e., plastic polymers that soften or become moldable when heated to a certain threshold temperatures, to solidify upon cooling. Thermosetting polymer materials can also be used as a facestock. The facestock 11 may be selected to have direct thermal printing capacity meaning that ink is incorporated inside the facestock 11 or in its top coating. The ink may then be released upon heating the facestock layer 11 such as by a thermal printer or a heat-emitting or heated instrument. The facestock 11 may be for example printed with a reversible or a non-reversible thermochromic ink. The use of a combination of printing methods is contemplated. All labels 10 of the present disclosure may or may not accept writing by a pen, pencil, marker or any other instrument for manual writing, typing or stamping. In an embodiment, a top surface of the facestock 11, i.e., upon which data may be inscribed, is substantially planar and continuous. Stated differently, when the label 10 is laid flat on an object that is planar, the top surface of the facestock 11 may be substantially planar, in that it does have any surface projections that do not disrupt the continuously planar surface.

An adhesive layer 12 may be coated on the underside of the facestock 11. A first support liner or release liner 13 may also be provided, from which the adhesive layer 12 with the facestock 11 can be released. As shown in FIGS. 1 and 2, the roll 1 may be defined by the release liner 13, shared by the multiple labels 10. For example, the release liner 13 may be an elongated strip, that may be arranged in a roll as in FIGS. 1 and 2. Tear strips 13A, that consist in spaced apart punctures or equivalent weakened section, may or may not be present, to facilitate the tearing off of a portion of the release liner 13. The tear strips 13A may be optional, for instance because of the micro-embossings 20 described below. Openings or notches 13B may also be present, as an option, and may be provided to serve as a visual indication or marker when the roll 1 is used in a printer (i.e., a better detection of the label with the optical sensor or like the sensing mechanism of the printer). The release liner 13 may also have other forms, such as a sheet, a strip, a fanfold (accordion like folding). A smaller liner may also be provided, sized to receive a single label 10, i.e., a one-to-one liner 13 to label 10 arrangement. In FIG. 2, a segment of the release liner 13 has three labels 10 per liner segment (i.e., between adjacent tear strips 13A), but other ratios are possible, just as the one label per segment of FIG. 1. Labels of different shapes and configurations are contemplated. Micro-embossing as described below of support liners of sheet format labels (e.g., A4, letter format) for printing in sheet format printers may facilitate the passage of the sheet through the printing mechanism and rollers due to modified texture, and for user manipulations.

The release liner 13 may be paper based, or polymer based, may comprise plant and/or cellulose fibers, with contemplated polymers including a polyester (PET), polypropylene, bi-axially oriented polypropylene (BOPP), polyethylene, polyolefin, polyvinyl or any other type of a polymer. For example, the release liner 13 may be a silicone or fluorosilicone coated support on which the adhesive layer 12 is harboured or retained, though other materials can be used, including waxes or other types of adhesive release coatings, etc, on a substrate. For example, if the support liner 13 is paper based, a low friction coating may be present to facilitate the peeling off of the facestock 11 and adhesive layer 12 from the support liner 13. Accordingly, when the release liner 13 is removed, the label 10 may be adhered to a surface, by the adhesive layer 12. In an embodiment, the label 10 relies on static cling as an alternative to having the adhesive layer 12. In another embodiment, the release liner 13 may have imaging properties meaning that the manual writing with a pen or a pencil or with any type of impact instrument or impact printer can create a copy of the image on the release liner 13. In this case, when the facestock 11 is removed from the liner 13, the copy of the printed information or the image remains on the release liner 13 similar to carbon-copying. The support liner 13 may have additional features such as a slit(s) in longitudinal and/or traverse directions that can facilitate the peeling of the label. The use of additional support liner(s) with or without micro-embossings, such as piggy-back type of label constructions is contemplated.

It is contemplated to add neutralized adhesive zones on along one or more edges of the facestock 11. The neutralized adhesive zones, such as one shown as 14 in FIG. 4, can be defined by the adhesive layer 12 being exposed to a neutralizing agent in these zones. In an embodiment, the neutralizing agent is used during production by lifting the facestock 11 with adhesive 12 from the support liner 13, applying the neutralizing agent and re-laminating the facestock 11 onto the support liner 13. As a result the adhesive 12 in such a zone may lose or significantly diminish its adhesion properties. Regardless of when or how it is applied, the neutralizing agent operates to reduce or eliminate (i.e. "neutralize") the adhesive effect of the adhesive 12 along the edges of the facestock 11, in the zones. This reduces the peel strength of the facestock 11 only along its edge(s), and thus may facilitate peeling off facestock 11 from the liner 13. In an embodiment, the neutralized zone 14 defines the first part of the label 10 across the edge that is positioned in a direction advancing towards a peeling mechanism to facilitate the peeling of the label 10. In other words the peeling of the label 10 starts from the neutralized edge and proceeds to peel-off the entire label 10 from the liner 13. The neutralizing agent may be any suitable material to achieve such functionality. Non-limiting examples of the neutralizing agent include liquid solvents, such as varnishes (e.g. water-based, solvent-based, ultraviolet, LED UV, urethane, etc.), and inks (e.g. urethane, flexographic, UV, LED UV or other types of printing inks). The neutralizing agent may also be another chemical applied in liquid or solid form. The neutralizing agent can be applied using a printing plate to print along the adhesive side of the tape 10. The use of the neutralizing agent in other areas of the adhesive label 10 beyond the edges is contemplated as well. In an embodiment, a patterned adhesive may be applied excluding the zone, such that instead of neutralizing the existing adhesive the zone may simply be without adhesive.

Referring to FIGS. 3 to 6, micro-embossings 20 are formed in the support liner 13. The micro-embossings 20 may be referred to as bosses, pin holes, holes, perforations, etc. For simplicity, the expression "micro-embossing" is used herein. The use "micro" is used to indicate that the embossings 20 are small, based on the dimensions provided herein, but not necessarily limited to the micro-scale. The micro-embossings 20 may be defined as protuberances projecting upwardly (or away) from a main plane P (FIGS. 4 and 5) of the liner 13, as shown in FIGS. 3-5. Consequently, an undersurface of the liner 13 may have cavities. The micro-embossings 20 may space the facestock 11 from the liner 13 and facilitate the peeling off of the facestock 11. Stated differently, the micro-embossings 20 may result in a space surrounding the embossings 20 in which there is no contact between the adhesive layer 12 and the support liner 13. Stated differently, the contact between the label 10 and the release liner 13 may be reduced by the presence of the embossings 20, in contrast to a label 10 adhered to the liner 13 without embossings 20. As an example, the reduction may be of at least 20% in some embodiments. Furthermore, the micro-embossings 20 may facilitate the tearing of the support liner 13 at a desired location which may provide additional facility in segmenting a portion of the roll 1 comprising labels 10, to tear away/remove the support liner 13 underneath the adhesive layer 12 to release the label 10. Depending on the release liner material and characteristics of the embossing/perforating, the tool may penetrate and cut through the liner 13, as in FIG. 4, or create an embossing 20 without cutting through and penetrating the liner 13, as in FIG. 5. In the embodiments of FIG. 4, the micro-embossings 20 are micro-perforations through the liner 13 that do not perforate through the facestock 11, but may extend into the adhesive layer 12, and may possibly slightly penetrate the base (i.e., undersurface) of the facestock 11 as shown in some parts of FIG. 4. The micro-embossings 20 in the form of perforations in the liner 13 as in FIG. 4 can be small dots or needle-holes or small cuts in a string or line (FIGS. 6A and 6C) or a grid (FIG. 6B), the micro-embossings 20 being close to each other to facilitate the peeling off of the liner 13. Furthermore, the micro-embossings 20 may be of any shape or form. The micro-embossings 20 may have an elongated shape as well, to have the appearance for example of a dash, "-", as observed in FIGS. 6A-6C. In the embodiment of FIGS. 3 and 5, the micro-embossings 20 do not perforate through the support liner 13. Therefore, the term embossing or embossed perforation includes actual penetration of the liner 13 or creating embossing without penetrating through the liner 13. In an embodiment, a mix of penetrating and non-penetrating embossings 20 in the same liner is possible. In both cases, the label 10 may be raised from a plane P of the liner 13 and/or a weakening of the liner 13 is achieved and facilitates bending of the liner 13 which in turn facilitates the peeling of the label 10 from the liner 13. Use of automated devices and/or peeling mechanisms for peeling and applying labels 10 on micro-embossed liner 13 is contemplated. In the embodiments of FIGS. 4 and 5, regardless of the penetration or absence of the penetration of the micro-embossings 20 into the facestock 11, the top surface of the facestock 11 may remain continuously smooth, i.e., without bosses or like projections that would result from the embossing process to create the micro-embossings 20. In an embodiment, the micro-embossings may have opposite orientation away from the label In other words the microembossing can be in either orientation from exterior of the liner 13 toward the adhesive 12 and facestock 11 and in the opposite direction from the side of the facestock 11 and adhesive 12 toward to the exterior of the support liner 13. This may result in reduced contact surface between the adhesive 12 and top surface of the support liner 13 due to the cavities resulting from the embossing.

Figure 6C:
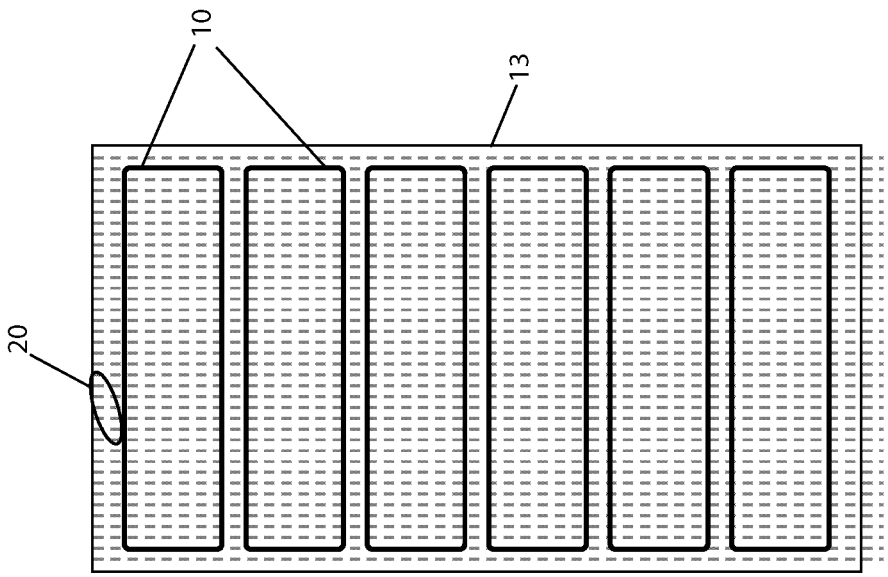
FIGS. 6A-6C are schematic views of the assembly of label and support liner with micro-embossings in accordance with the present disclosure.
Figure 6B:
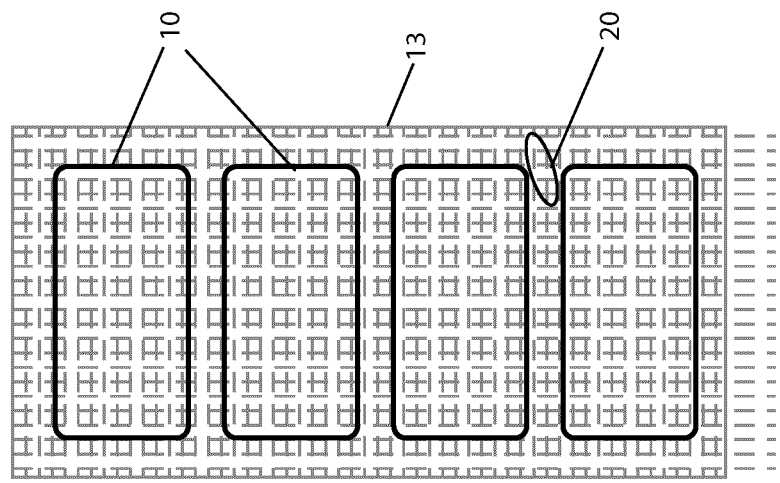
Figure 6A:
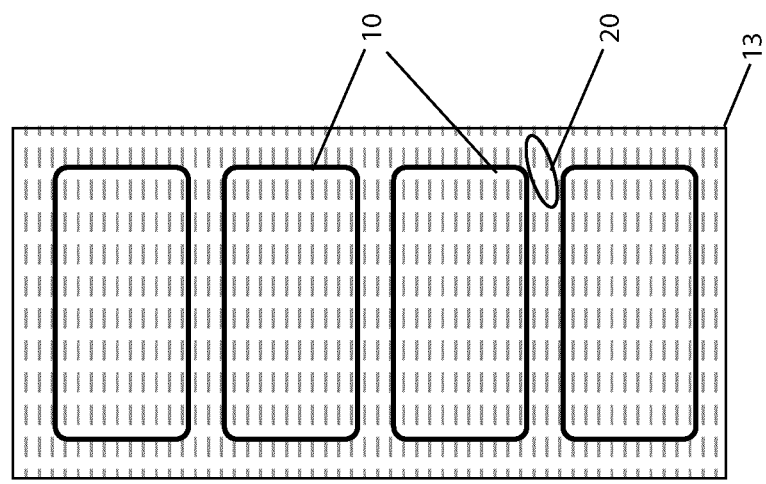

As shown in FIGS. 6A to 6C, the embossings 20 might be in aligned with a longitudinal direction of the liner 13 and/or transverse to the longitudinal direction of the liner 13, or may be in any other orientation or combination thereof, if the embossings 20 are elongated. The embossing 20 may be in a pattern or without any pattern, or randomly distributed. A variety of patterns of the micro-embossing 20 may be provided in a same liner 13. According to an embodiment, a distance between the micro-embossings 20 is between 0.01 mm and 3.5 mm measured between the end of one embossing 20 and the start of the adjacent embossing 20. According to another embodiment, the distance between the micro-embossings 20 is between 1.5 mm and 7.0 mm, or between 3.0 m and 13.0 mm. The distances between micro-embossings 20 may be different in any orientation including longitudinal or widthwise orientation. A length (if straight) or diametrical dimension (if round) of the micro-embossings 20 can be as small as 0.5 mm as its largest dimension at the base or on the top of the embossing as a non-limiting example and can extend through the length or the width of the liner 13 upon which the label 10 is harbored. As an embodiment the length and diametrical dimensions can be between 0.7 mm and 1.6 mm. In another embodiment the length and diametrical dimensions can be between 1.5 mm and 3.5 mm. Yet in another embodiment the length and diametrical dimensions can be between 3.0 mm and 7.0 mm. The micro-embossings 20 can have different shapes such as linear, rectangular, square, circular, triangular, polygonal, star-like, atypical, or any other shape that can cause micro-elevation of the label 10 from a plane of the adhesive release surface (silicon or other) of the release liner 13, and a space. Linear uninterrupted continuous lines of micro-embossings 20 in vertical and/or horizontal orientation are contemplated. As an embodiment, linear uninterrupted continuous lines such as semi-tunnel shaped lines in any orientation without penetrating the support liner are contemplated. The embossing or perforations may have a pattern or may be without any pattern, e.g., randomly distributed, or a variety of patterns can be used on the same liner. The micro-embossings 20 can be created by using a mechanical tool, a beam of a laser or any other method that is capable of embossing or penetrating the liner 13. Transfer of the label facestock 11 with adhesive 12 from one release liner 13 to another release liner 13 is common practice. The present disclosure contemplates the label or label facestock transfer from an original liner (non embossed) to an embossed liner, such as the liner 13 with embossings 20. A transfer tape can be used to create label material. The transfer tape may have the adhesive layer 12, the waste liner 30 releasably adhered to a first surface of the adhesive layer; the support liner 13 releasably adhered to a second surface of the adhesive layer 12, the support liner 13 defining a plurality of embossings 30 projecting from a surface of the support liner 13 toward or away from the waste liner 30.

In an embodiment, a minimum number of micro-embossings 20 in the liner 13 is nine micro-embossings 20 per square centimeter of under-label surface, for instance in 3 rows or 3 columns or 3 in a single file of any direction. In another embodiment, a number of micro-embossings 20 in the liner 13 is between 4 and 20 per square centimeter of under-label surface. In yet another embodiment, a number of micro-embossings 20 in the liner 13 is between 18 and 60 per square centimeter of under-label surface. In yet another embodiment, a number of micro-embossings 20 in the liner 13 is between 49 and 170 per square centimeter of under-label surface. Other values are contemplated. In some instances, the embossing pattern in the liner 13 may be visible on the adhesive side of the facestock 11 without penetrating through the facestock 11. The embossing of the liner 13 may be done before, during or after label manufacturing process. Providing a pre-embossed liner 13 for a label 10 is also contemplated.

FIGS. 3-5 are schematic and may not be to scale. Although other thicknesses are possible, some exemplary thicknesses are now given to define one contemplated embodiment. The thickness of the facestock 11 may be between 0.3 mil and 40 mil. As an embodiment, the thickness of the facestock 11 is between 0.4 mil and 2.6 mil. As another embodiment, the thickness of the facestock 11 is between 1 mil and 4.6 mil. As another embodiment, the thickness of the facestock 11 is between 0.8 mil and 8.0 mil. The thickness of the support liner 13 may be between 0.4 mil and 20 mil. As another embodiment, the thickness of the support liner 13 is between 0.9 mil and 4.0 mil. As another embodiment, the thickness of the support liner 13 is between 0.8 mil and 6.0 mil.

Figure 7A:
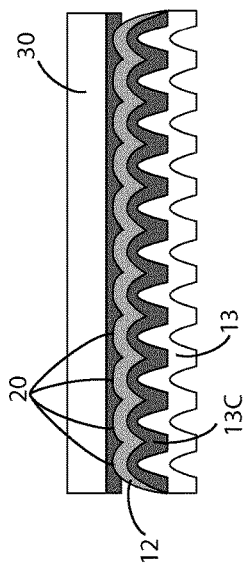
FIGS. 7A-7E are schematic sectional views of the assembly of label and support liner with micro-embossings in accordance with the present disclosure, using a transfer tape.
Figure 7B:
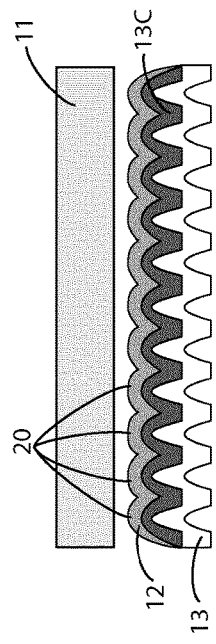
Figure 7C:
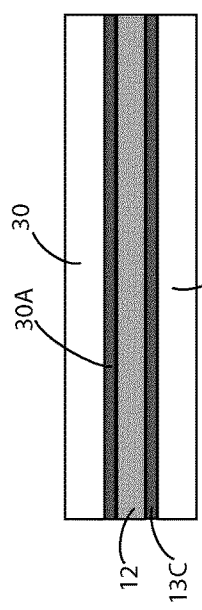
Figure 7D:
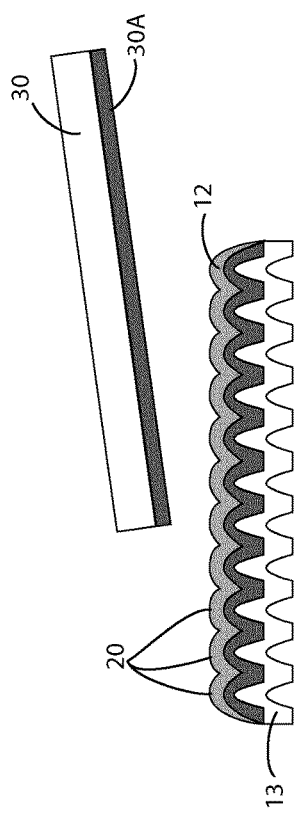
Figure 7E:
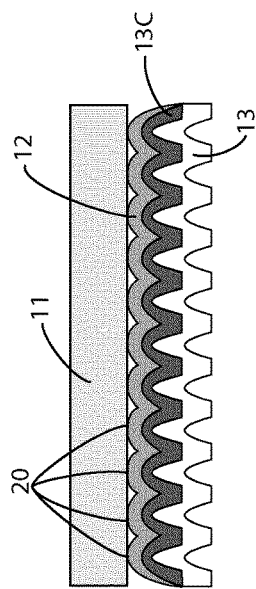

In label manufacturing, transfer tapes may be used, i.e., an adhesive trapped between the two liners with a release coating wherein the adhesive contacts the release coating of each support liner. Referring to FIGS. 7A to 7E, an exemplary use of the micro-embossings 20 in the context of a transfer tape is shown. In FIG. 7A, one of the liners, i.e., liner 13 in the illustrated example, is referred to a main liner and the other one is called a waste liner 30, and is located on the other side of the layer of adhesive 12. For clarity, both the liner 13 and the waste liner 30 are shown as supporting a release coating layer, respectively as 13C and 30A, but the release coating layers may be integral i.e., integrated, or applied upon directly onto the liners 13 and 30 (as opposed to being a separate layer). Therefore, both liners 13 and 30 may detach from the layer of adhesive 12. In FIG. 7B, micro-embossings 20 are made in the assembly of FIG. 7A, with the embossing force applied to an undersurface of the liner 13. In FIG. 7B, the micro-embossings 20 are shown as extending to the release coating layer 30A. However, the various embossing penetrations of FIGS. 4 and 5, including perforations, may be reproduced in the assembly of FIG. 7B. The transfer tape is used for making customized label materials by removing the waste liner 30, as in FIG. 7C and transferring a facestock to the adhesive 12 that remains tied to the main liner 13, as in FIGS. 7D and 7E. The removal of the waste liner 30 may be facilitated by the micro-embossings 20, as they may weaken the bond between the adhesive 12 and the waste liner 30. The resulting construction, shown in FIG. 7E, becomes a label material which comprises the facestock 11, the adhesive 12 and a support liner 13, with micro-embossings 20 in the layer of adhesive 12 and support liner 13. The adhesive 12 is permanently anchored to the facestock 11 and upon removal of the facestock 11, the adhesive 12 remains anchored to it as in the case of label 10, with the micro-embossings 20. In an embodiment, the resulting label material is substantially larger than the dimension standards of labels 10, but the tape may be die-cut so as to create labels of any appropriate size from the label material. The micro-embossing 20 of the main liner 13 of a transfer tape is therefore contemplated. The use of micro-embossed transfer tape may allow a customization of label materials without customizing primary material production, as customizing primary material production may requires significant minimum quantities. Instead, the customization can be done at a die-cutting press level by selecting a desired transfer tape with the desired liner 13, adhesive 12, with embossings 20 and laminating the desired facestock 11 over it. In such an application, the use of a micro-embossed liner 13 in the transfer tape construction is desirable to facilitate the removal of the facestock 11 after the die-cutting of labels and/or to use the micro-embossings 20 to give tearing properties to labels cut out from the transfer tape. Furthermore, the micro-embossed liner 13 may facilitate the printing process due to the resulting texture of the liner 13, allowing an increase in friction with handling equipment.

A method may be devised for assembling a label material with steps of embossing a support liner, applying an adhesive layer to the support liner, and applying a facestock to the adhesive layer, the embossing and applying the adhesive layer being in any order. Other steps may include applying a waste liner to the adhesive layer on an opposite side from the support liner, and removing the waster liner prior to applying a facestock to the adhesive layer; die-cutting a label from the label material, the label including the facestock and the adhesive, the label being supported by the support liner; detaching the label from the support liner, the detaching is done manually or automatically.

The invention claimed is:

1. A label and liner assembly comprising:
   at least one label including a facestock and an adhesive layer on a surface of the facestock, the facestock configured to receive and display information thereon; and
   a support liner releasably adhered to the adhesive layer, the support liner defining a plurality of embossings projecting from a first surface of the support liner toward or away from the label, the embossings spacing the facestock from the support liner, a second surface of the support liner, opposite the first surface, having cavities at the embossings.

2. The label and liner assembly according to claim 1, including a plurality of the at least one label for the support liner.

3. The label and liner assembly according to claim 1, wherein the liner is wound into a roll.

4. The label and liner assembly according to claim 1, wherein the liner is in a sheet.

5. The label and liner assembly according to claim 1, wherein at least some of the embossings perforate through the support liner.

6. The label and liner assembly according to claim 1, wherein at least some of the embossings do not perforate through the support liner.

7. The label and liner assembly according to claim 1, wherein the adhesive layer has a neutralized zone.

8. The label and liner assembly according to claim 1, wherein at least some of the embossings extend into an undersurface of the facestock.

9. The label and liner assembly according to claim 1, wherein at least some of the embossings extend into the adhesive layer with embossing an undersurface of the facestock.

10. The label and liner assembly according to claim 1, wherein the embossings have an elongated shape.

11. The label and liner assembly according to claim 1, wherein a number of embossings per square centimeter is between 4 and 20 inclusively.

12. The label and liner assembly according to claim 1, wherein a number of embossings per square centimeter is between 18 and 60 inclusively.

13. The label and liner assembly according to claim 1, wherein a number of embossings per square centimeter is between 49 and 170 inclusively.

14. The label and liner assembly according to claim 1, wherein a distance between an end of one of the embossings and a start of an adjacent one of the embossings is between 0.01 mm and 3.5 mm, inclusively.

15. The label and liner assembly according to claim 1, wherein a distance between an end of one of the embossings and a start of an adjacent one of the embossings is between 1.5 mm and 7.0 mm, inclusively.

16. The label and liner assembly according to claim 1, wherein a distance between an end of one of the embossings and a start of an adjacent one of the embossings is between 3.0 mm and 13.0 mm, inclusively.

17. The label and liner assembly according to claim 1, wherein a thickness of the facestock is between 0.3 mil and 40 mil, inclusively.

18. The label and liner assembly according to claim 1, wherein a thickness of the support liner is between 0.4 mil and 20 mil, inclusively.

19. The label and liner assembly according to claim 1, wherein a facestock is blank.

20. The label and liner assembly according to claim 1, further including data printed on the facestock.

* * * * *